United States Patent [19]
Sato et al.

[11] Patent Number: 5,335,131
[45] Date of Patent: Aug. 2, 1994

[54] TAPE CARTRIDGE HAVING A TRANSPARENT PANEL COVERING THE TAPE SENSING OPENING

[75] Inventors: Masanori Sato; Osamu Koizumi, both of Miyagi, Japan

[73] Assignee: Sony Corporation, Japan

[21] Appl. No.: 18,314

[22] Filed: Feb. 16, 1993

[30] Foreign Application Priority Data

| Feb. 17, 1992 | [JP] | Japan | 4-028783 |
| Feb. 19, 1992 | [JP] | Japan | 4-031161 |
| Feb. 21, 1992 | [JP] | Japan | 4-033798 |

[51] Int. Cl.⁵ ............................................. G11B 23/02
[52] U.S. Cl. ................................. 242/347; 242/342; 360/132
[58] Field of Search .................. 360/132; 242/192, 199

[56] References Cited

U.S. PATENT DOCUMENTS

| 3,949,951 | 4/1976 | Porter | 242/192 |
| 4,262,860 | 4/1981 | Hurtig | 242/192 |
| 5,239,436 | 8/1993 | Aizawa | 360/132 |

*Primary Examiner*—A. J. Heinz
*Attorney, Agent, or Firm*—Ronald P. Kananen

[57] ABSTRACT

A tape cartridge including an improved housing is disclosed. The housing has a base plate on which tape packs are rotatably mounted and a cover secured to the base plate and having an opening. A transparent panel is fitted to the opening of the cover and allows a light to pass from an outside to an inside of the housing. The transparent panel has on peripheral portions thereof projections engageable with grooves which are formed on peripheral portions of the cover adjacent the opening.

25 Claims, 11 Drawing Sheets

TAPE CARTRIDGE HAVING A TRANSPARENT PANEL COVERING THE TAPE SENSING OPENING

BACKGROUND OF THE INVENTION

The present invention relates to a tape cartridge adapted for magnetic recording of information, and more particularly to an improvement in structure of a housing of the tape cartridge.

U.S. Pat. No. 3,692,255 discloses a tape cartridge including a housing in which a magnetic recording tape wound on two tape reels is driven by a flexible belt wrapped around a driving roller.

U.S. Pat. No. 4,262,860 discloses a tape cartridge of increased tape capacity which includes a rectangular housing having a significantly greater length than those of such prior art tape cartridges as U.S. Pat. No. 3,692,255.

An improved tape cartridge with increased tape capacity is described in U.S. patent application Ser. No. 799,307 filed by Aizawa et al. The tape cartridge includes a T-shaped housing having large and small area sections.

Some of such tape cartridges of increased tape capacity include a housing, a base plate on which tape packs of a magnetic recording tape are rotatably disposed, and a cover of opaque resin secured to the base plate. The cover has an opening to which a transparent panel is fitted. The transparent panel allows a sensing light emitted from a light source in a tape drive to pass therethrough so that an end of the magnetic recording tape is detected. The transparent panel is secured to the opening of the cover by means of a fastening member or in such a manner as welding, for example, high frequency welding.

However, the transparent panel often tends to suffer from distortion upon welding. The distortion causes an axis of the light to be offset from an in situ position thereof when the light passes through the distorted panel. As a result, an accurate detection of the end of the magnetic tape is disturbed. Further, since a panel mounting area of the cover is relatively small, the panel mounting operation by using the fastening member, such as a bolt and nut, requires high accuracy.

In addition, when the tape cartridge of increased tape capacity is inserted into a tape drive, a portion of the cartridge housing is seated in the tape drive and the remaining portion projects outwardly therefrom. The seated portion of the cartridge housing is subject to stress caused when a gravity center of the tape cartridge is present at the remaining portion upon insertion of the tape cartridge. Accordingly, the tape cartridge necessitates having a housing with a sufficient structural strength against the stress.

There is a need for a tape cartridge capable of preventing distortion of a transparent panel upon assembly and having a housing with an increased structural strength.

SUMMARY OF THE INVENTION

An object of the present invention is to provide a tape cartridge which is improved in preventing distortion of a transparent panel upon assembly.

Another object of the present invention is to provide a tape cartridge including an improved housing having increased structural strength.

According to the present invention, there is provided a tape cartridge including a housing accommodating therein two tape packs of a magnetic recording tape, a plurality of tape guides, an endless drive belt, a belt driving roller on which the drive belt is wrapped to be driven, and a plurality of belt guide rollers over which the drive belt is wrapped, the housing comprising:

a base plate;

a cover secured to the base plate and provided with an opening, the cover cooperating with the base plate to define an inner space for receiving the tape packs therein;

a transparent panel fitted into the opening of the cover to allow a light to pass from an outside to an inside of the housing; and engaging means for securing the transparent panel to the cover, the engaging means being respectively provided on peripheral portions of the cover and peripheral portions of the transparent panel opposed to the peripheral portions of the cover.

DESCRIPTION OF THE PREFERRED EMBODIMENT

Figure 1:
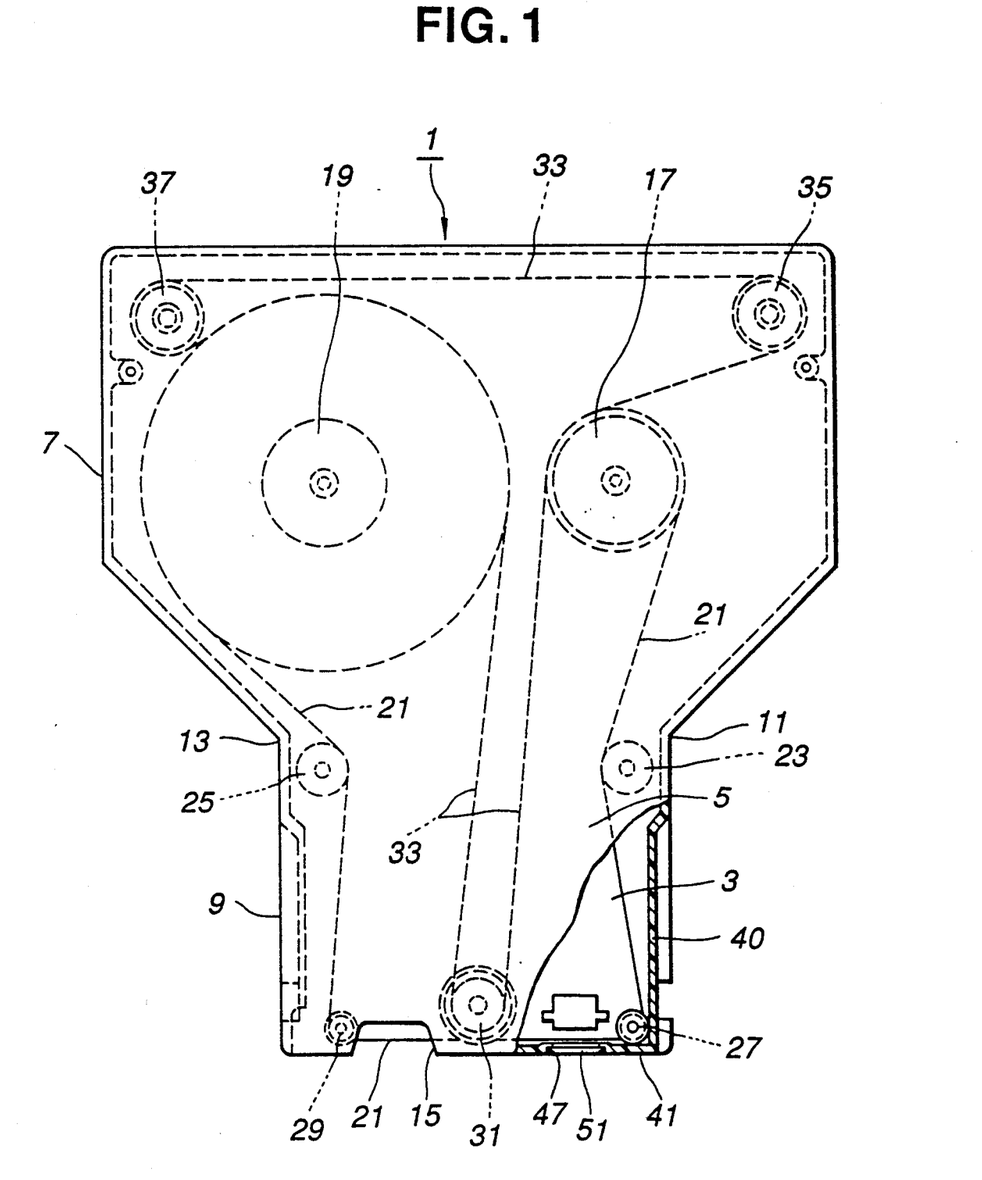
FIG. 1 is a plan view, partially broken away, of a preferred embodiment of a tape cartridge according to the present invention.

Referring now to FIG. 1, there is shown a preferred embodiment of a tape cartridge according to the present invention. The tape cartridge 1 includes an approximate T-shaped cartridge housing having a rear section 7 and a front section 9. The front section 9 connects the rear section 7 to form opposite corner portions 11 and 13. The front section 9 extends between the corner portions 11 and 13 to have a relatively small area while the rear section 7 extends further beyond the corner portions 11 and 13 to have a relatively large area. The small area front section 9 is adapted to be received into a tape drive (not shown) when the tape cartridge 1 is inserted into the tape drive while the large area rear section 7 projects outwardly from the tape drive. The small area front section 9 is provided on a frontmost face thereof with an opening 15 into which a tape recording/reproducing head (not shown) is accommodated upon insertion of the tape cartridge 1 into the tape drive.

The cartridge housing of the tape cartridge 1 has a base plate 3 and a cover 5 secured to the base plate 3 and made of opaque plastic, for example ABC resin (acrylonitrile-butadiene-styrene resin).

As shown in FIG. 1, a pair of tape packs 17 and 19 are rotatably mounted in the large area rear section 7 on the base plate 3 about respective axes of rotation. A tape web 21 of a magnetic recording tape is attached at one end thereof to the tape pack 17 and at the other end thereof to the tape pack 19. A pair of guide rollers 23 and 25 are disposed on the base plate 3 adjacent the corner portions 11 and 13, respectively, where the rear and front sections 7 and 9 of the tape cartridge 1 are joined. A pair of guide pins 27 and 29 are disposed on the base plate 3 at opposite corner portions of the small area front section 9 in a remote relation to the guide rollers 23 and 25. Disposed between the guide pins 27 and 29 is a driven roller 31 which is driven by a drive member (not shown) of the tape drive when the tape cartridge 1 is inserted into the tape drive. The tape web 21 derived from the tape pack 17 in turn passes over the guide roller 23, the guide pin 27, the driven roller 31, the guide pin 29 and the guide roller 25 and leads to the tape pack 19.

An endless drive belt 33 is wrapped over the driven roller 31 and a pair of idle rollers 35 and 37 which are disposed on the base plate 3 at opposite corners of the large area rear section 7. The drive belt 33 engages the tape packs 17 and 19 and thereby forms two arcuate portions.

Upon insertion of the tape cartridge 1 into the tape drive, the tape recording/reproducing head of the tape drive contacts the tape web 21 in the opening 15 of the tape cartridge 1. When the driven roller 31 is rotatably driven in a counterclockwise direction, the tape packs 17 and 19 rotate in a clockwise direction so that the tape web 21 travels from the tape pack 17 to the tape pack 19. On the other hand, when the driven roller 31 is rotatably driven in a clockwise direction, the tape packs 17 and 19 rotate in a counterclockwise direction. Thus, the tape web 21 moves from the tape pack 19 to the tape pack 17.

Figure 2:
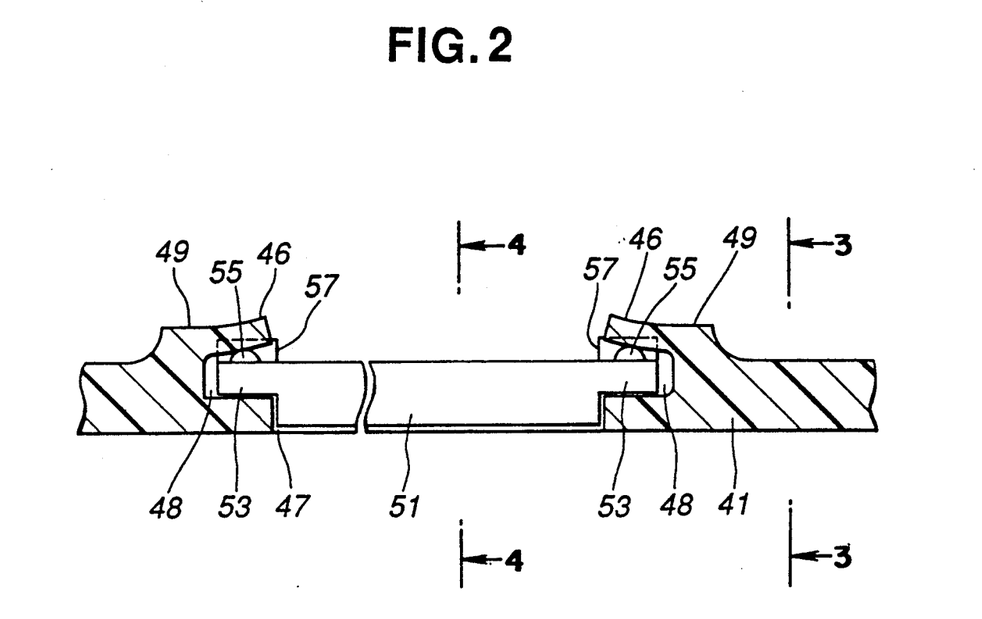
FIG. 2 is an enlarged view of the tape cartridge, showing a transparent panel mounted on a cover of the tape cartridge.
Figure 3:
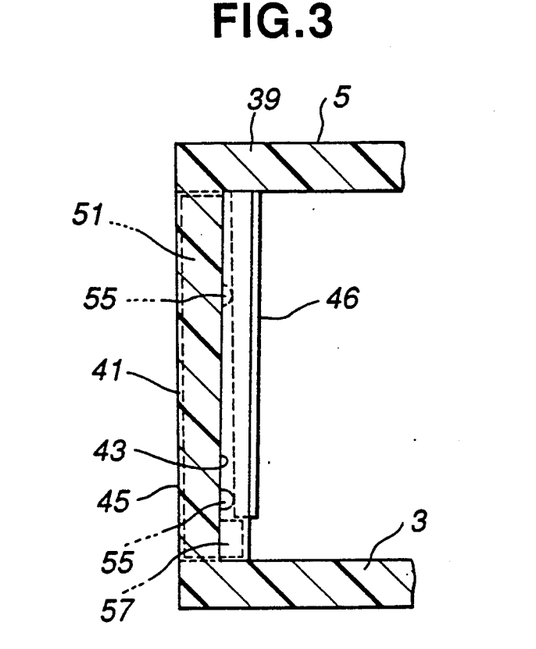
FIG. 3 is a sectional view taken along the line 3—3 of FIG. 2.
Figure 4:
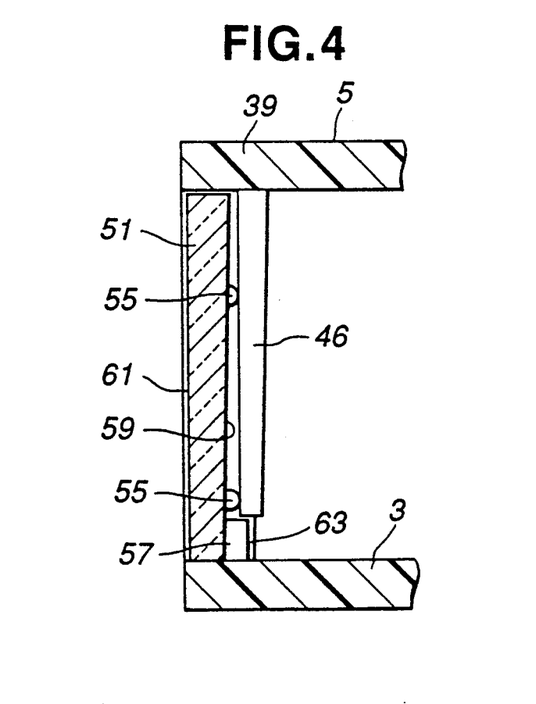
FIG. 4 is a sectional view taken along the line 4—4 of FIG. 2.

The cover 5 includes a top wall 39 which has substantially the same configuration as the base plate 3 and has a large area rear section and a small area front section. A side wall 40 extends downwardly from a periphery of the top wall 39 as viewed in FIG. 1. A front wall 41 is tapered downwardly as viewed in FIG. 3, so as to have a slant inner face 43 inclined approximately one degree relative to an outer face 45 of the front wall 41. The tapering is provided for easy removal of the cover 5 from a mold in the manufacturing process. The front wall 41 has a rectangular opening 47 extending upwardly from a lower end thereof as viewed in FIG. 5. As seen in FIGS. 2 to 4, the front wall 41 is formed with peripheral portions 49, 49 which have a greater thickness than a remaining portion of the front wall 41 and extend along a periphery of the opening 47. The thick peripheral portions 49, 49 are formed with vertical grooves 48, 48 so as to have elastically deformable rear flange portions 46, 46, respectively. A rectangular transparent panel 51 is inserted into the grooves 48, 48 from the lower side of the front wall 41.

Figure 6:
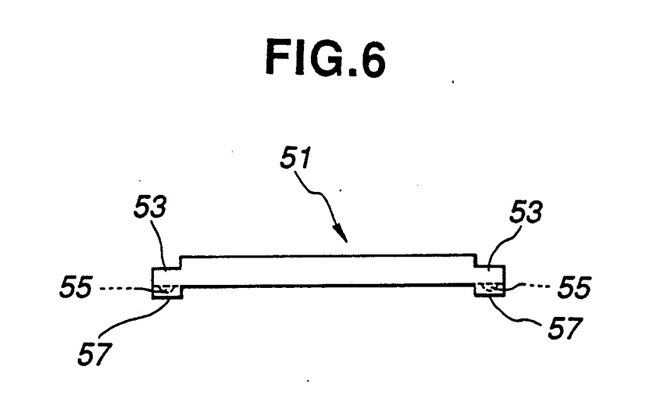
FIG. 6 is a plan view of the transparent panel, viewed from the underside.
Figure 7:
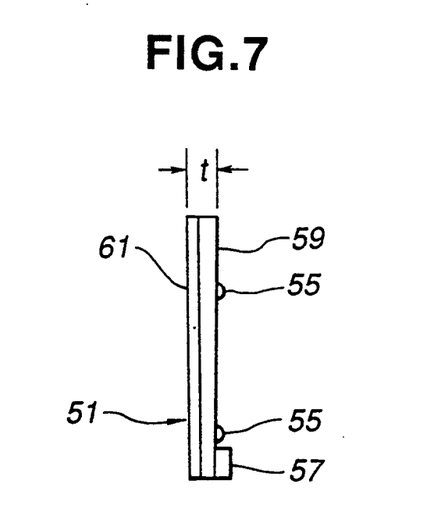
FIG. 7 is a side view of the transparent panel.

The transparent panel 51 is made of transparent resin such as polycarbonate and has a thickness "t" as indicated in FIG. 7, which is substantially the same as that of the front wall 41. The transparent panel 51 is tapered downwardly to have a slant face 59 inclined at substantially the same angle as the inner slant face 43 of the front wall 41, relative to an opposite face 61 thereof. As shown in FIG. 6, the transparent panel 51 has flanged extensions 53, 53 having a smaller thickness than a body portion of the transparent panel 51 and formed along the opposite side peripheries thereof. Two pairs of hemispherical projections 55, 55 are provided at upper and lower portions of each of the flanged extensions 53, 53. When the transparent panel 51 is inserted into the grooves 48, 48, the rear flange portions 46, 46 of the thick peripheral portions 49, 49 of the front wall 41 are urged outwardly as seen in FIG. 2 by the hemispherical projections 55, 55. As best seen in FIG. 4, the hemispherical projections 55, 55 are engaged with front faces of the rear flange portions 46, 46 by a restoring force of the rear flange portions 46, 46.

Figure 5:
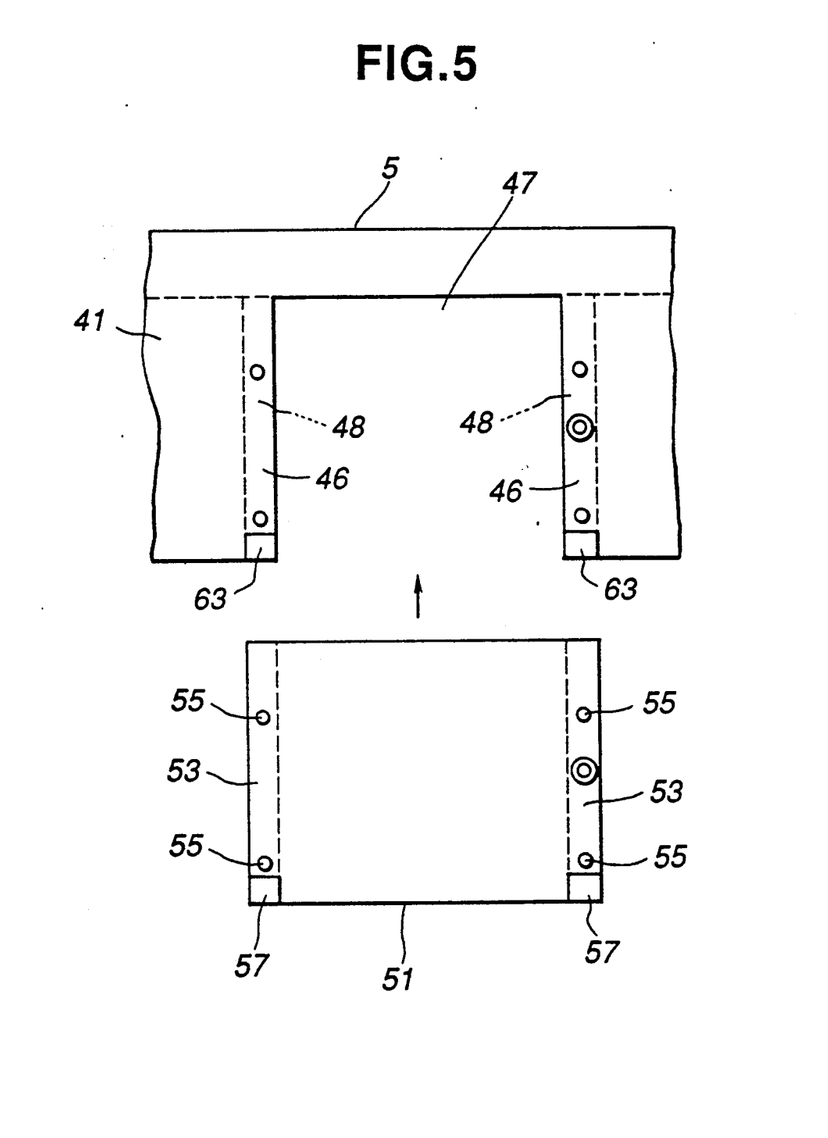
FIG. 5 is an exploded side view of FIG. 2, viewed from the inside of the cover.

As seen in FIGS. 6 and 7, a pair of stoppers 57, 57 are formed on lower ends of the flanged extensions 53, 53 of the transparent panel 51. The stoppers 57, 57 are fitted to the notches 63, 63 formed at lower ends of the respective rear flange portions 46, 46 of the thick peripheral portions 49, 49 of the front wall 41 as seen in FIGS. 4 and 5. The stoppers 57, 57 serve for preventing such erroneous assembly of the transparent panel 51 that a wrong side of the transparent panel 51 is inserted into the opening 47 of the front wall 41. Thus, the transparent panel 51 is held in the opening 47 of the front wall 41 of the cover 5 by fitting the flanged extensions 53, 53 into the grooves 48, 48 and engaging the stoppers 57, 57 with the notches 63, 63.

Figure 8:
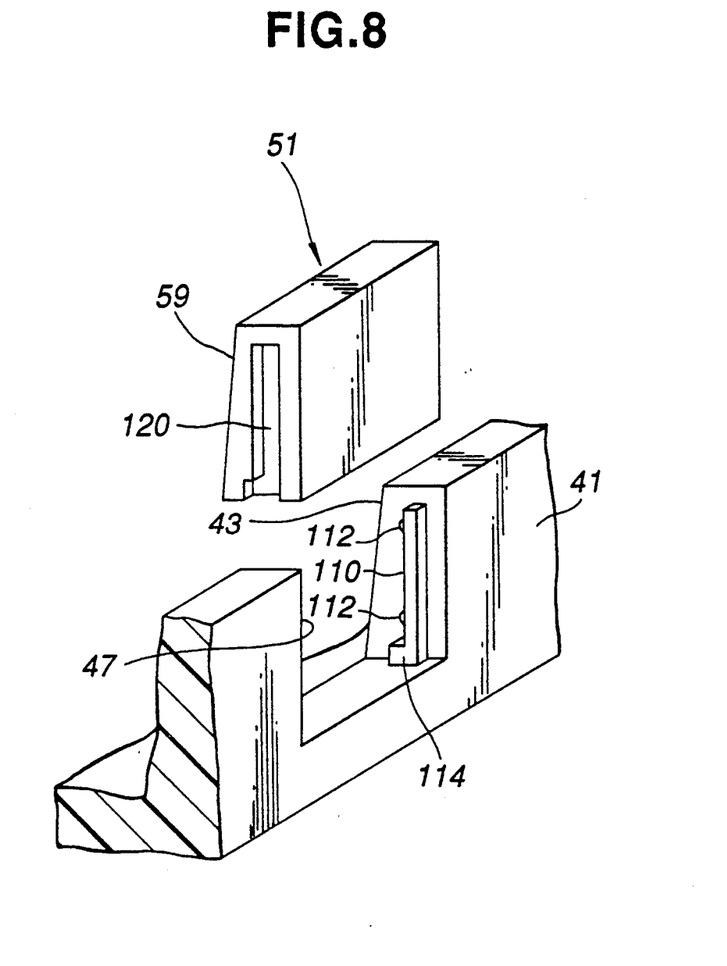
FIG. 8 is an exploded perspective view of a second embodiment of the tape cartridge according to the present invention, showing a transparent panel and a panel mounting portion of a cover.
Figure 9:
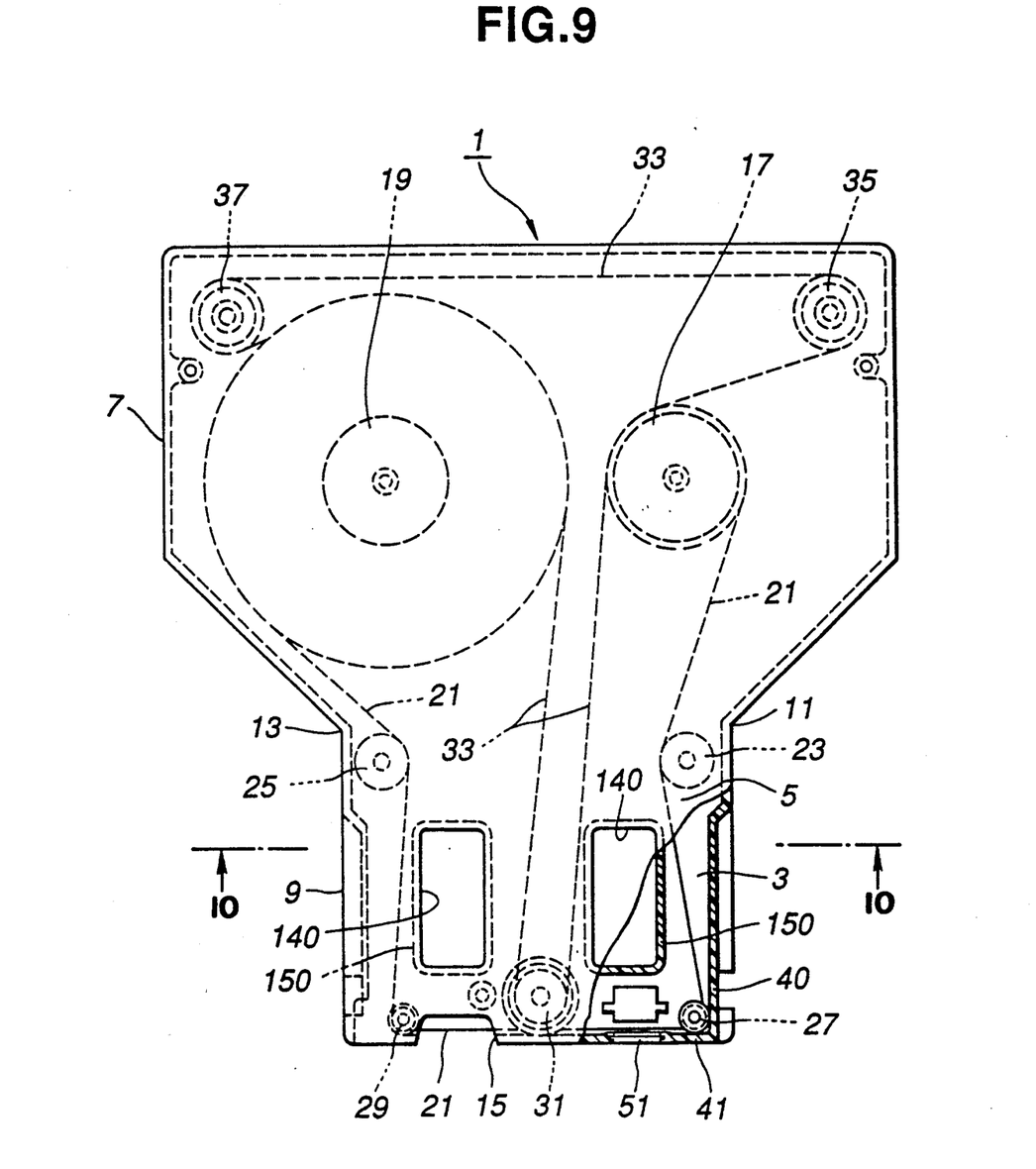
FIG. 9 is a plan view, partially broken away, of a third embodiment of the tape cartridge according to the present invention, in which radiating apertures are formed on a cover.
Figure 10:
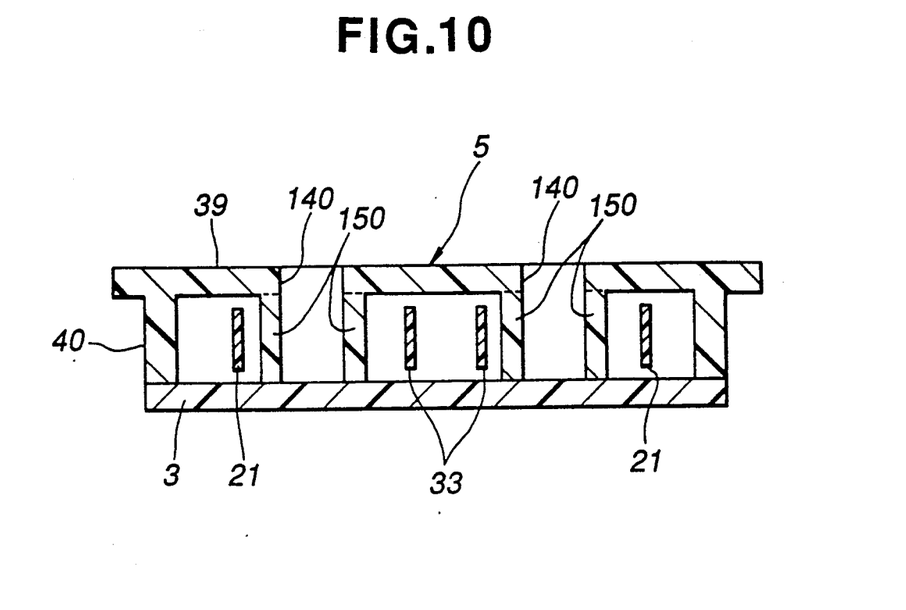
FIG. 10 is a sectional view taken along the line 10—10 of FIG. 9.

Referring to FIG. 8 and FIGS. 9 and 10, there are shown a second embodiment and a third embodiment of a tape cartridge according to the present invention, respectively, in which like numerals indicate like parts of the first embodiment described above and therefore the detailed explanation is omitted.

As shown in FIG. 8, the front wall 41 is formed with substantially L-shaped lock wedges 110 having on a rear face thereof hemispherical projections 112. The lock wedges 110 with the hemispherical projections 112 engage L-shaped grooves 120 formed on opposite side faces of the transparent panel 51. Flange portions 114 extending rearwardly from upright portions of the L-shaped lock wedges 110 serve as stoppers having the same function as that of the stoppers 57, 57 of the transparent panel 51 of the first embodiment.

As shown in FIGS. 9 and 10, the top wall 39 of the cover 5 has rectangular radiating apertures 140, 140 in the small area front section 9 of the tape cartridge 1. The radiating apertures 140, 140 are disposed in predetermined positions where neither the tape web 21 nor the drive belt 33 exists therebelow. Annular rib walls 150, 150 are disposed along a periphery of each of the radiating apertures 140, 140 and extend downwardly up to the base plate 3 as seen in FIG. 10. The annular rib walls 150, 150 serve for improvement in mechanical strength against distortion or deformation of the top wall 39 of the cover 5, and as additional radiation surface for the heat which is generated during travel of the magnetic recording tape 21 within the cartridge housing 1, wherein the heat is escaped through the radiating apertures 140, 140 to the outside of the cartridge housing 1.

Figure 11:
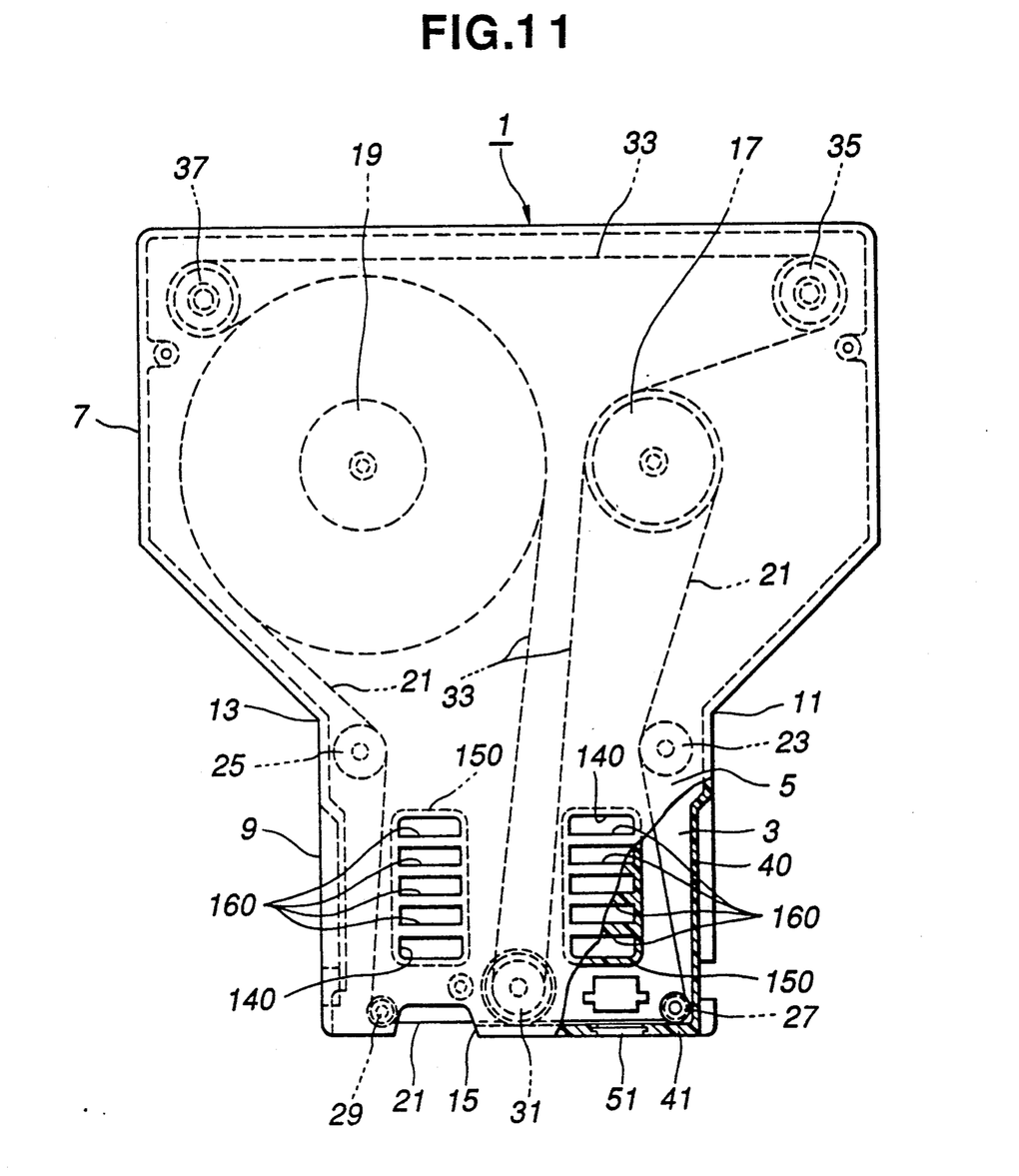
FIG. 11 is a plan view, partially broken away, of a fourth embodiment of the tape cartridge according to the present invention, in which radiating fins are formed on a cover.

Referring to FIG. 11, there is shown a fourth embodiment of the tape cartridge according to the present invention, in which like numerals indicate like parts of the third embodiment described above and therefore the detailed explanation is omitted. As shown in FIG. 11, the annular rib walls 150, 150 have a plurality of radiating fins 160 which span between opposite inner surfaces thereof. The provision of the radiating fins 160 accelerates the radiation of the heat in the cartridge housing 1.

Figure 12:
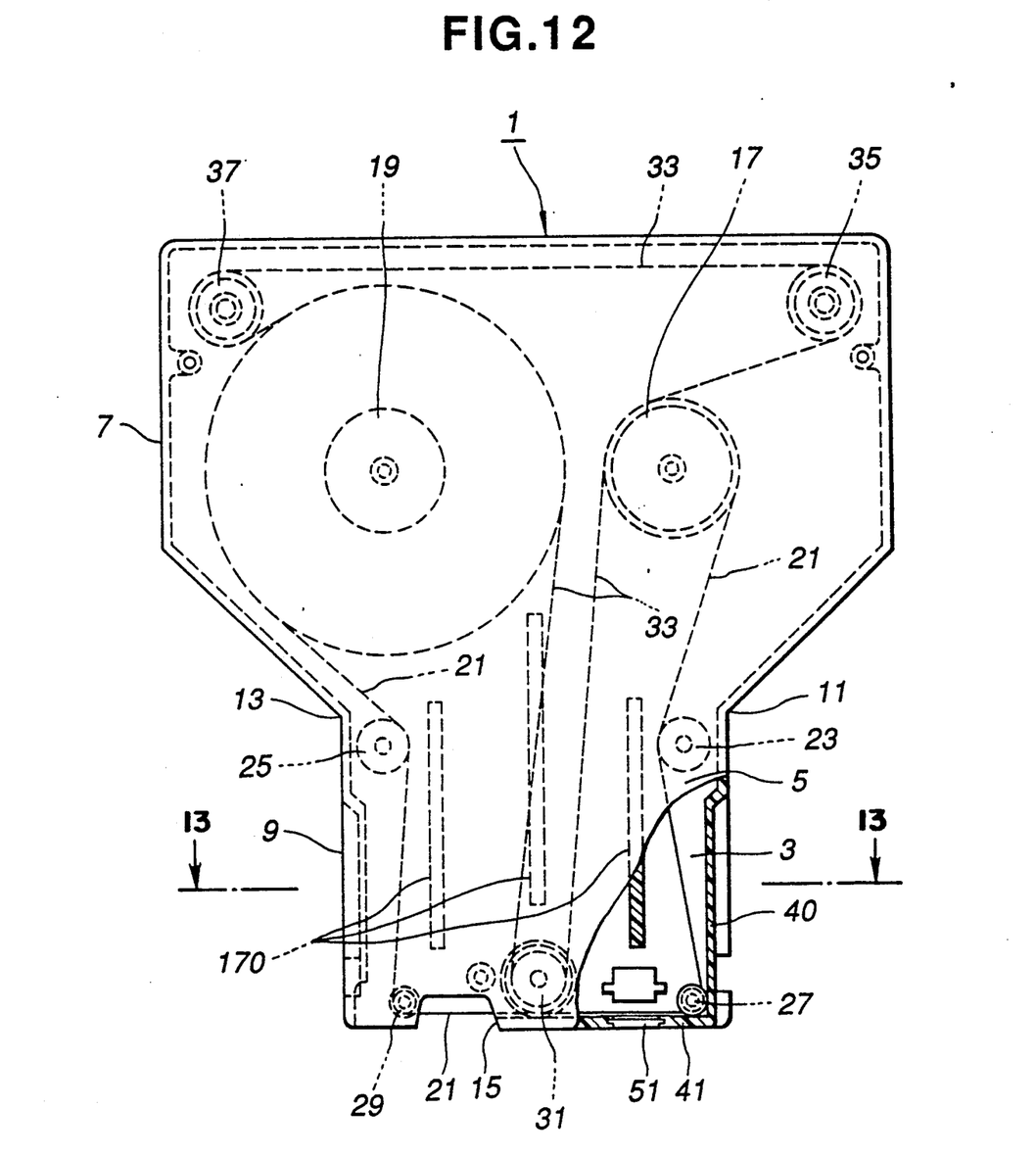
FIG. 12 is a plan view, partially broken away, of a fifth embodiment of the tape cartridge according to the present invention, in which reinforcing ribs are formed on a cover.
Figure 13:
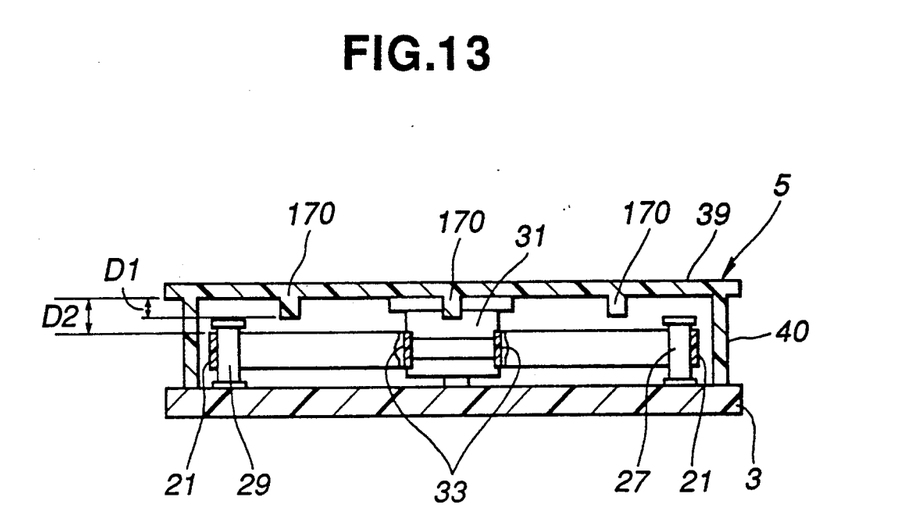
FIG. 13 is a sectional view taken along the line 13—13 of FIG. 12.

Referring to FIG. 12, there is shown a fifth embodiment of the tape cartridge according to the present invention, in which like numerals indicate like parts of the first embodiment described above and therefore the detailed explanation is omitted. As shown in FIG. 12, the top wall 39 of the cover 5 has reinforcing ribs 170 which are secured to an inner face of the top wall 39 in the form of three rows and extend from the small area front section 9 over the large area rear section 7. The reinforcing ribs 170 project from the inner face of the top wall 39 toward the base plate 3. A height of the reinforcing ribs 170 are determined such that a distance D1 as indicated in FIG. 13, is smaller than a distance D2 between the inner face of the top wall 39 and an upper edge of the tape web 21 or the drive belt 33. Thus, the tape web 21 and the drive belt 33 are free from contact with the reinforcing ribs 170 having the distance D1, resulting in smooth travel thereof in the cartridge housing 1. In a case where the reinforcing ribs 170 are arranged in a position remote from the tape web 21 and the drive belt 33, the reinforcing ribs 170 may have a height which is as much as a distance between the inner face of the top wall 39 and an upper face of the base plate 3. The provision of the reinforcing ribs 170 improves the mechanical strength of the cover 5.

What is claimed is:

1. A tape cartridge including a housing accommodating therein two tape packs of a magnetic recording tape, a plurality of tape guides, an endless drive belt, a belt driving roller on which the drive belt is wrapped to be driven, and a plurality of belt guide rollers over which the drive belt is wrapped, said housing comprising:
   a base plate;
   a cover secured to said base plate and provided with an opening, said cover cooperating with said base plate to define an inner space for receiving said tape packs therein;
   a transparent panel fitted into said opening of said cover to allow a light to pass from an outside to an inside of said housing; and
   engaging means for securing said transparent panel to said cover, said engaging means being respectively provided on peripheral portions of said cover and peripheral portions of said transparent panel opposed to the peripheral portions of said cover.

2. A tape cartridge as claimed in claim 1, wherein said engaging means include projections formed on one of said cover and said transparent panel, and grooves formed on the other thereof so as to be elastically engageable with said projections.

3. A tape cartridge as claimed in claim 1, wherein said engaging means include a tight-fit member formed on one of said cover and said transparent panel so as to assure interconnection between said cover and said transparent panel.

4. A tape cartridge as claimed in claim 3, wherein said tight-fit member is in the form of a hemispherical projection.

5. A tape cartridge as claimed in claim 3, further comprising means for preventing erroneous insertion of said transparent panel into said opening of said cover, said preventing means being provided on said cover and said transparent panel so as to be engageable with each other.

6. A tape cartridge as claimed in claim 5, wherein said preventing means include a projection formed on one of said cover and said transparent panel and a notch formed on the other thereof.

7. A tape cartridge as claimed in claim 1, wherein said transparent panel has one slant face inclined at a predetermined angle relative to (the other face) opposed to the slant face.

8. A tape cartridge as claimed in claim 1, further comprising a reinforcing rib extending from said cover toward said base plate without interference with the magnetic recording tape.

9. A tape cartridge as claimed in claim 1, further comprising a radiating aperture formed on said cover and a rib formed around and adjacent the radiating aperature and extending therefrom up to said base plate.

10. A tape cartridge as claimed in claim 9, wherein said rib has radiating fins extending inwardly from a peripheral inner face thereof.

11. A tape cartridge with increased tape capacity including a housing having a front section at which the tape cartridge is inserted into a tape drive, and a rear section connected with said front section and projecting outwardly from the tape drive upon insertion of the tape cartridge, said housing accommodating therein two tape packs of a magnetic recording tape, a plurality of tape guides, an endless drive belt, a belt driving roller mounted to said front section, and a plurality of belt guide rollers, said housing comprising:
   a base plate on which said tape packs, said tape guides, said belt driving roller and said belt guide rollers are mounted;
   a cover secured to said base plate and provided with an opening, said cover cooperating with said base plate to define an inner space for receiving said tape packs therein;
   a transparent panel fitted into said opening of said cover to allow a light to pass from an outside to an inside of said housing; and
   engaging means for securing said transparent panel to said cover, said engaging means being respectively provided on peripheral portions of said cover and peripheral portions of said transparent panel opposed to the peripheral portions of said cover.

12. A tape cartridge as claimed in claim 11, wherein said engaging means include projections formed on one of said cover and said transparent panel, and grooves formed on the other thereof so as to be elastically engageable with said projections.

13. A tape cartridge as claimed in claim 11, wherein said engaging means include a tight-fit member formed on one of said cover and said transparent panel so as to assure interconnection between said cover and said transparent panel.

14. A tape cartridge as claimed in claim 13, wherein said tight-fit member is in the form of a hemispherical projection.

15. A tape cartridge as claimed in claim 13, further comprising means for preventing erroneous insertion of said transparent panel into said opening of said cover, said preventing means being provided on said cover and said transparent panel so as to be engageable with each other.

16. A tape cartridge as claimed in claim 15, wherein said preventing means include a projection formed on one of said cover and said transparent panel and a notch formed on the other thereof.

17. A tape cartridge as claimed in claim 11, wherein said transparent panel has one slant face inclined at a predetermined angle relative to the other face opposed to the slant face.

18. A tape cartridge as claimed in claim 11, further comprising a reinforcing rib extending from said cover toward said base plate without interference with the magnetic recording tape.

19. A tape cartridge as claimed in claim 11, further comprising a radiating aperture formed on said cover and a rib formed around and adjacent the radiating aperture and extending therefrom up to said base plate.

20. A tape cartridge as claimed in claim 19, wherein said rib has radiating fins extending inwardly from a peripheral inner face thereof.

21. A tape cartridge as claimed in claim 11, wherein said front and rear sections of said housing cooperate to form at least one corner portion.

22. A tape cartridge as claimed in claim 21, wherein said plurality of tape guides include a tape guide disposed adjacent said one corner portion so as to be out of interference with said magnetic recording tape.

23. A tape cartridge as claimed in claim 21, wherein said front and rear sections of said housing cooperate to form another corner portion in addition to said one corner portion.

24. A tape cartridge as claimed in claim 23, wherein said front section of said housing extends between said one and another corner portions, while said rear section of said housing extends further beyond said one and another corner portions so as to have a larger area than said front section.

25. A tape cartridge as claimed in claim 24, wherein said plurality of tape guides include another tape guide disposed adjacent said another corner portion.

* * * * *